(12) United States Patent
McCawley et al.

(10) Patent No.: US 12,005,928 B2
(45) Date of Patent: Jun. 11, 2024

(54) DANGEROUS ROAD USER DETECTION AND RESPONSE

(71) Applicant: GM Cruise Holdings LLC, San Francisco, CA (US)

(72) Inventors: Travis McCawley, Berkeley, CA (US); Christopher Ward, San Francisco, CA (US); Saranya Konala, San Francisco, CA (US); Nikola Noxon, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 359 days.

(21) Appl. No.: 17/398,528

(22) Filed: Aug. 10, 2021

(65) Prior Publication Data

US 2023/0052039 A1   Feb. 16, 2023

(51) Int. Cl.
*B60W 60/00* (2020.01)
*B60K 35/00* (2006.01)
*B60W 40/04* (2006.01)
*B60W 50/14* (2020.01)
*G06N 20/00* (2019.01)
*B60K 35/10* (2024.01)
*B60K 35/28* (2024.01)

(52) U.S. Cl.
CPC ......... *B60W 60/0015* (2020.02); *B60K 35/00* (2013.01); *B60W 40/04* (2013.01); *B60W 50/14* (2013.01); *B60W 60/0027* (2020.02); *G06N 20/00* (2019.01); *B60K 35/10* (2024.01); *B60K 35/28* (2024.01); *B60K 2360/11* (2024.01); *B60K 2360/178* (2024.01); *B60W 2050/146* (2013.01); *B60W 2554/4046* (2020.02)

(58) Field of Classification Search
CPC ......... B60W 60/0015; B60W 60/0027; B60W 40/04; B60W 50/14; B60W 2554/4026; B60W 2050/146; G06N 20/00; B60K 35/00; B60K 2370/11; B60K 2370/178
USPC ......................................................... 701/23
See application file for complete search history.

(56) References Cited

U.S. PATENT DOCUMENTS

| | | | |
|---|---|---|---|
| 2018/0111612 A1* | 4/2018 | Jiang | B60W 30/12 |
| 2019/0337451 A1* | 11/2019 | Bacchus | B60Q 9/008 |
| 2020/0074230 A1* | 3/2020 | England | G01S 7/4808 |
| 2021/0284176 A1* | 9/2021 | Wiesenberg | B60W 50/16 |
| 2022/0164026 A1* | 5/2022 | Sicconi | G08B 5/223 |
| 2023/0033977 A1* | 2/2023 | Patel | B60W 40/04 |
| 2023/0118340 A1* | 4/2023 | Husain | B60W 50/14 |
| | | | 701/27 |

* cited by examiner

*Primary Examiner* — Mahmoud S Ismail
(74) *Attorney, Agent, or Firm* — Michael DiCato

(57) ABSTRACT

Methods and systems are provided for detecting and responding to dangerous road users. In some aspects, a process can include steps for receiving sensor data of a detected object from an autonomous vehicle, determining whether the detected object is exhibiting a dangerous attribute, generating output data based on the determining of whether the detected object is exhibiting the dangerous attribute, and updating a machine learning model based on the output data relating to the dangerous attribute.

20 Claims, 6 Drawing Sheets

DANGEROUS ROAD USER DETECTION AND RESPONSE

BACKGROUND

1. Technical Field

The subject technology provides solutions for autonomous vehicle systems, and in particular, for detecting and responding to dangerous road users.

2. Introduction

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide a safe and efficient transportation. Such tasks may require the collection and processing of large quantities of data disposed on the autonomous vehicle.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Figure 1:
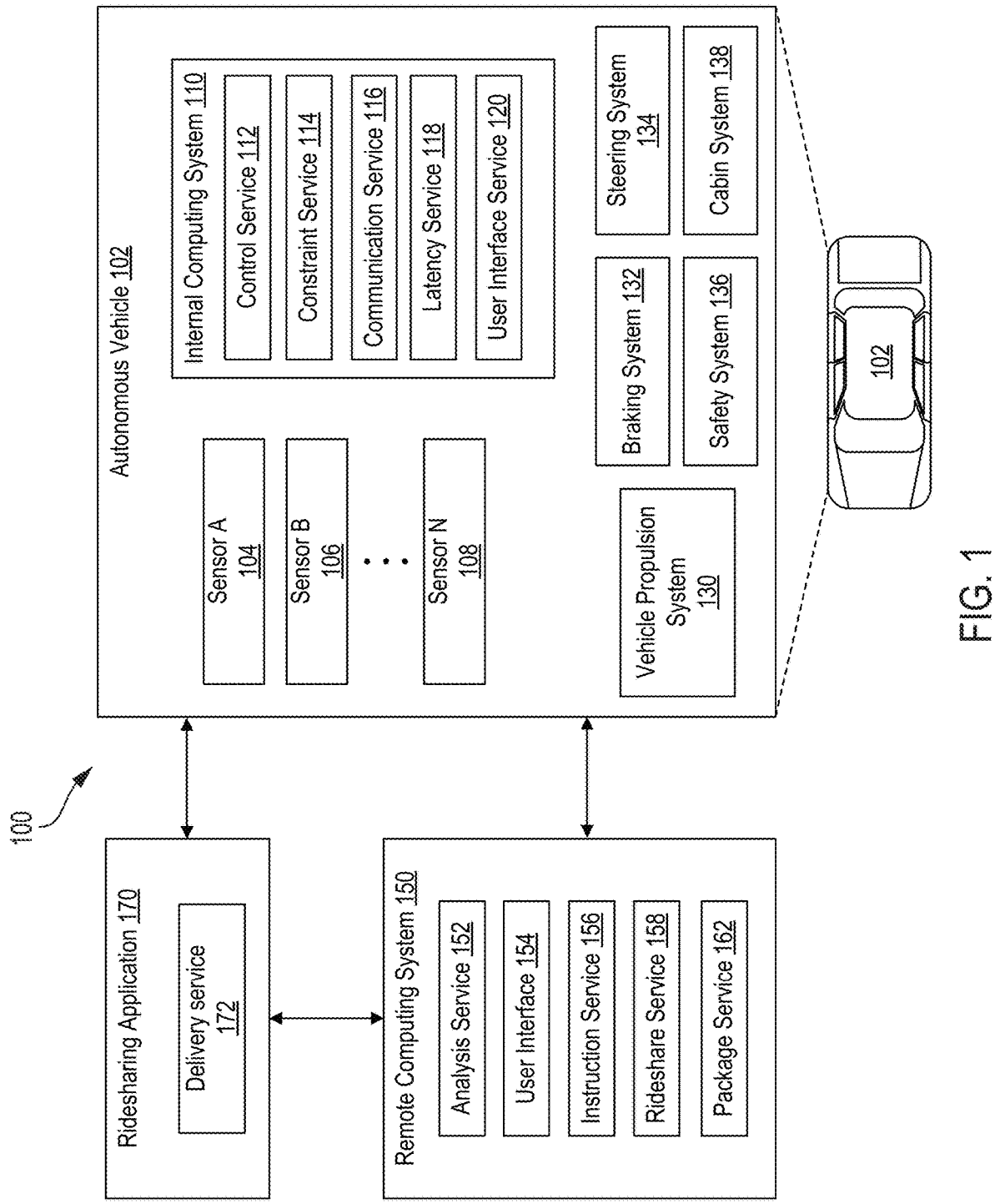
FIG. 1 illustrates an example system environment that can be used to facilitate autonomous vehicle navigation and routing operations, according to some aspects of the disclosed technology.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation.

Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102.

Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides connectivity using one or more cellular transmission standards, such as long-term evolution (LTE), 3G, 5G, or the like.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As discussed in further detail below, machine-learning models of the disclosed technology can be based on machine learning systems that include generative adversarial networks (GANs) that are trained, for example, using pairs of labeled and unlabeled image examples. In some aspects, unlabeled (input) images can be provided based on LiDAR map data for example, that is produced from a rasterized high-resolution three-dimensional LiDAR map. As such, the disclosed labeler can perform image-to-image translation, wherein input images (based on LiDAR data) are labeled through the insertion of geometric bounding boxes and association with semantic labels. Labeled image outputs provided by the labeling system can then be utilized by AVs to quickly determine driving boundaries, and to facilitate navigation and route planning functions.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 2:
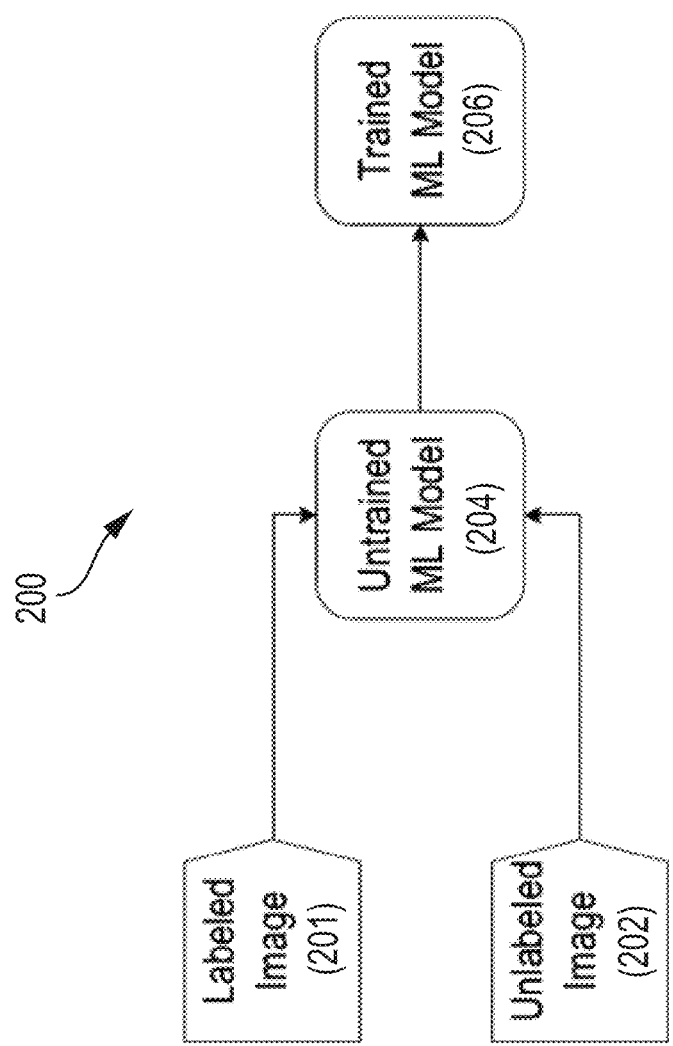
FIG. 2 illustrates an example system used for training a machine-learning (ML) model to perform semantic labeling, according to some aspects of the disclosed technology.

FIG. 2 illustrates an example system 200 used for training a machine-learning (ML) model to perform bounding box labeling (geometric labeling) and semantic labeling, according to some aspects of the technology. As illustrated in system 200, examples of labeled images 201 and unlabeled images 202 are provided to untrained ML model 204. Untrained ML model 204 can include one or more general adversarial networks (GANs), which are configured to learn labeling conventions based on labeled image examples (201). For instance, untrained ML model 204 can learn how geometric bounding boxes (polygons) and semantic labels are to be associated with certain image features. In some aspects, bounding boxes can be colored based on the semantic association. For example, crosswalks can be bounded by yellow colored polygons, whereas intersections may be bounded by red polygons, etc. In other implementations, semantic labels such as metadata word tags can be associated with bounding boxes around salient image features, or associated with the image features directly.

Figure 3:
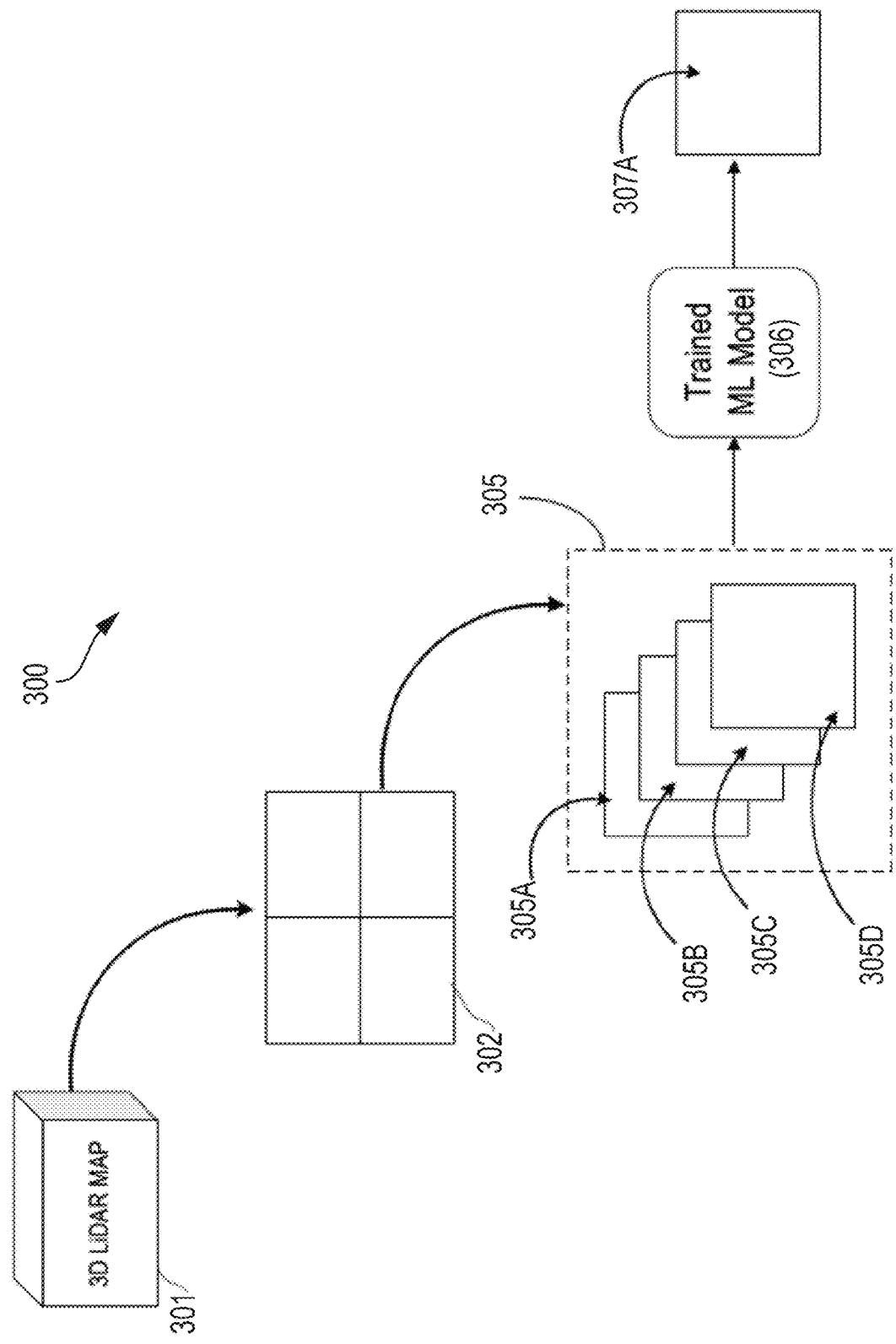
FIG. 3 illustrates an example block diagram of a semantic labeling system, according to some aspects of the disclosed technology.

FIG. 3 illustrates a conceptual block diagram of a semantic labeling system 300, according to some aspects of the technology. In system 300, a LiDAR map (e.g., a high-resolution 3D map) 301 is first converted into a two-dimensional (2D) map 302, for example, using an inverse perspective mapping process or other dimensional reduction technique. The 2D LiDAR map 302 is then segmented (e.g., rasterized) into a plurality of image segments or tiles 305 (e.g., tiles 305A, 305B, 305C, and 305D). Each tile is then provided to a trained ML labeling model, such as trained ML model 306. Segmentation of the 2D LiDAR map can improve label processing by reducing the size of input data provided to ML model 306. Tiling can also facilitate parallel processing, for example, utilizing multiple labeling models (not shown) in a parallel processing architecture.

The outputs of ML model 306 are labeled image tiles. For example, labeled tile 307A can represent a labeled image-to-image transformation resulting from processing performed on 2D LiDAR image input tile 305A. That is, labeled tile 307A can include one or more bounding boxes (polygons) that identify image features salient to AV navigation, such as, crosswalks, sidewalks, roadways, on-ramps, driveways, parking lots, parking spaces, bike-lanes, road-signs, and/or traffic lights, etc. As discussed above, bounding boxes can be associated with semantic labels. In some approaches, semantic labeling associations can be indicated by color coding, wherein bounding box color indicates the enclosed image feature. Alternatively (or additionally) semantic labeling can be performed using metadata tags, for example that provide a word-label for the associated image feature i.e., "crosswalk", "intersection", or "lane boundary", etc.

As described herein, one aspect of the present technology is to detect and respond to dangerous road users. The present disclosure contemplates that in some instances, detecting road users that are performing dangerous maneuvers (e.g., a drunk driver that is swerving) and responding accordingly by having an autonomous vehicle perform evasive maneuvers or by providing information of the dangerous maneuvers to the appropriate authorities.

Drunk, distracted, and/or aggressive drivers present a constant and disproportionate safety risk to other road users. When human drivers notice such behaviors from other road users, they will frequently respond by driving more cautiously or attempting to avoid the offending vehicle. Such proactive preventative measures may be required to avoid a future safety incident, which may otherwise be unavoidable. Notably, the driving behavior of drunk, distracted and/or aggressive drivers is distinct from nominal driving behavior of your typical vehicle driver. In response, human drivers typically note these kinds of behaviors in other drivers and respond accordingly with novel actions that are not normally employed during nominal driving scenarios. Additionally, these offending vehicles pose a risk to other human road users and autonomous vehicles. Such behavior is generally illegal and can result in a citation if noticed by the appropriate authorities. However, law enforcement is not omnipresent and such behaviors can go unreported, resulting in future vehicle accidents.

Aspects of the disclosed technology address the foregoing limitations of conventional driving techniques by providing automatic identification of drunk, distracted, and/or aggressive drivers (including vehicle drivers, cyclists, and pedestrians) and responses with specific defensive driving techniques and/or reporting of relevant information to the local authorities (e.g., law enforcement or an autonomous vehicle system). In some implementations, the disclosed technology can also improve the safety of an autonomous vehicle fleet, passenger comfort when transporting customers, and the general safety of the road for all road users.

Figure 4:
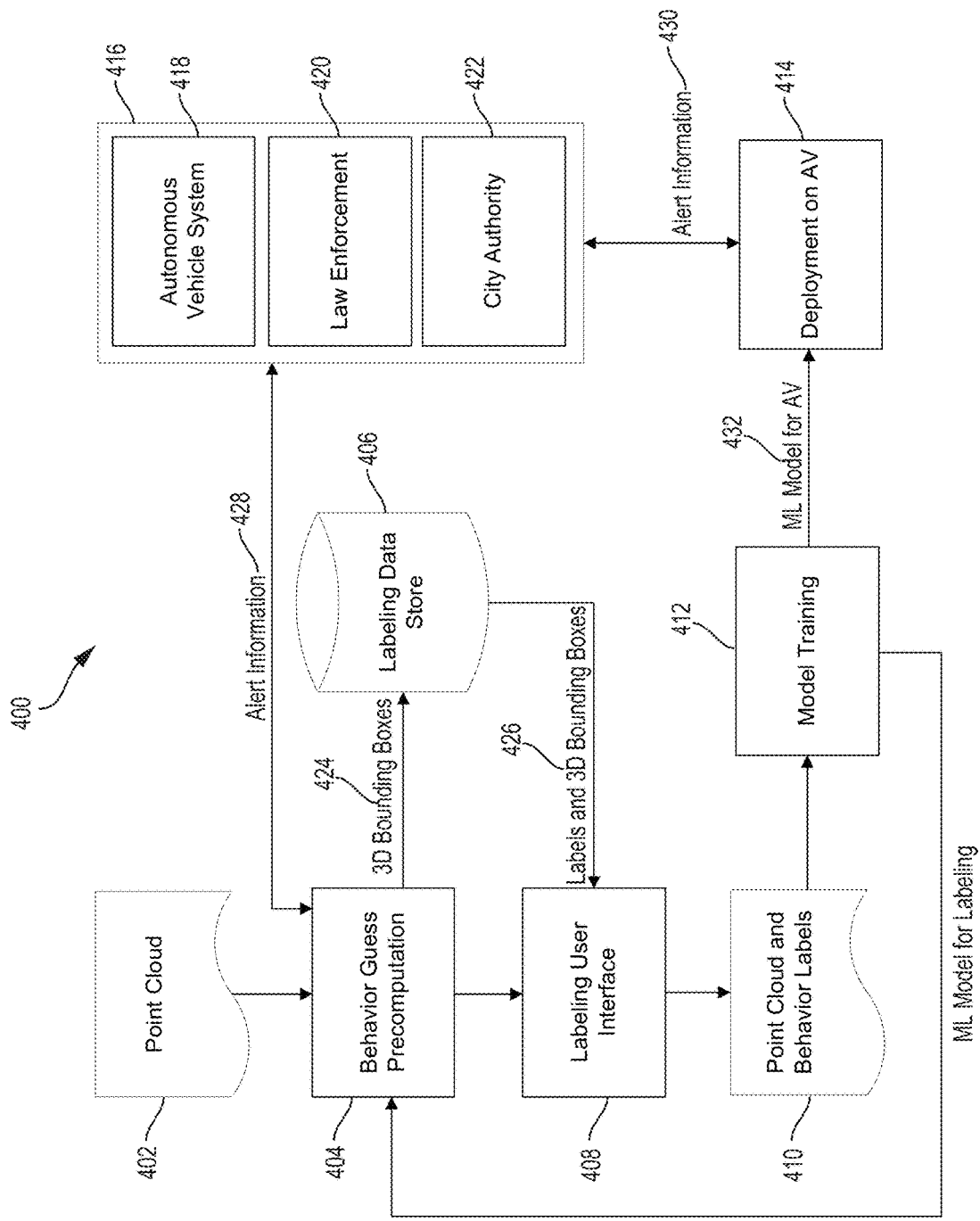
FIG. 4 illustrates an example process of behavior detection automation, according to some aspects of the disclosed technology.

FIG. 4 illustrates an example process of behavior detection automation 400, according to some aspects of the disclosed technology. In some implementations, the behavior detection process 400 can include a technique that detects and responds to dangerous road users. For example, the behavior detection process 400 can include a step 402 of receiving a point cloud by an autonomous vehicle system 418 (e.g., the system environment 100 of FIG. 1) from an autonomous vehicle (e.g., the autonomous vehicle 102 of FIG. 1).

The behavior detection process 400 begins with step 402, in which a point cloud, point cloud data, or sensor data can be captured via sensors (e.g., camera, radar, Lidar, and sensors 104, 106, 108 of FIG. 1) and received by an autonomous vehicle system 418 from an autonomous vehicle 102. Point cloud 402 of the behavior detection process 400 can include sets of points that describe an object or surface at various points in time. For example, point cloud 402 can be generated by utilizing laser scanning technology such as Lidar to generate 2D/3D models or images of a detected object (e.g., a vehicle, a cyclist, and a pedestrian). Each point of point cloud 402 can contain data that can be integrated with other data sources or used to generate 3D models of detected objects at various points in time. The sensor data can further include images of the detected object (e.g., vehicle in question) that can be utilized to identify the detected object. For example, the images of the detected object can include images of the vehicle's license plate, the make and model of the vehicle, and the driver's face and motions, which may then be provided to law enforcement 420 or city authorities 422 for assistance or future designations of the area as a "high risk" zone.

Thereafter, the behavior detection process 400 may advance to step 404, in which a precomputation process can be performed to guess a behavior of the detected object based on the point cloud data of step 402. For example, when an object is detected by the behavior detection process 400 of the autonomous vehicle system 418, point cloud data of the detected object can be received and precomputation processes performed to determine an initial guess of the behavior of the detected object. The precomputation process of step 404 can be processed by a processor as described herein. Step 404 of the behavior detection process 400 may further include generating 3D or 2D bounding boxes 424 around the detected object based on the precomputation processes and tracking the detected object in real time. For example, behavior detection process 400 can leverage a machine learning models such as a bird's eye view (BEV) models, PointPillar models (e.g., organizing point clouds into vertical columns), or any other machine learning models suitable for the intended purpose and understood by a person of ordinary skill in the art.

Step 404 of behavior detection process 400 can also include training short-distance machine learning models and long-distance machine learning models. The short-distance machine learning models can be utilized for the "4 inner band tiles," while the long-distance machine learning models can be utilized for the "12 outer band tiles" as described herein. Machine learning models outputs can then be filtered (e.g., based on confidence score, etc.) and then concatenated.

In some implementations, step 404 of behavior detection process 400 can also be processed by the autonomous vehicle 102. For example, the autonomous vehicle 102 can be configured to identify other road users (e.g., vehicle drivers, cyclists, and pedestrians) who may be drunk, distracted, and/or aggressive (i.e., "dangerous drivers"). In some instances, the autonomous vehicle 102 can utilize external, detectable attributes of the driver's behavior to identify such drivers. Some of the attributes, which may be used for such identification, can include: steering wobbles/weaving from a straight lane, frequent crossing of lane boundaries or being off the road, sudden acceleration/deceleration, tailgating, stopping unexpectedly and erratically, collisions/near collisions with other road users, increased reaction time relative to a nominal reaction time, and divergence in behavior versus nominal predictions.

In other implementations, the internal computing system 110 of the autonomous vehicle 102 can utilize algorithms that score and quantify the quality of a provided motion plan. For example, the internal computing system 110 of the autonomous vehicle 102 can utilize the algorithms in combination with a perception/tracking system to assess the quality/safety of other road users based on the attributes and metrics as described herein.

Step 404 of the behavior detection process 400 can also include utilizing a dangerous driver detection system that can target certain driver behavior types rather than bulk classification and prediction. For example, the behavior detection process 400 can utilize autonomous vehicle planning and scoring algorithms to quantify the behavior of other drivers in order to automatically identify dangerous driving. The behavior detection process 400 can further utilize existing exposure data to automatically identify dangerous driving. Furthermore, the behavior detection process 400 can utilize a graphical user interface (GUI)/in-car experience for passengers to identify dangerous drivers that they believe should be reported accordingly. The behavior detection process 400 can also include leveraging of extant external signs of dangerous driving in an automated manner. The dangerous driver detection system can be coupled with defensive driving techniques of the behavior detection process 400. The behavior detection process 400 can further include leveraging third party (e.g., other drivers, cyclists, and pedestrians) reaction time estimates for prediction and planning to generate better/safer autonomous vehicle behaviors during deployment (e.g., step 414 of the behavior detection process 400).

Step 404 of the behavior detection process 400 can further include providing alert information 428 of the guessed behavior and any associated data (e.g., images and recordings of the vehicle and associated persons) to other sources 416 including the autonomous vehicle system 418, law enforcement 420, and city/state/federal authorities 422. By doing so, the other sources 416 can provide additional information to the behavior detection process 400 (e.g., step 404) relating to the alert information 428 of the guessed behavior of the detected object. By providing images or recordings of the detected objected (e.g., an image of a license plate or a driver or a video recording of a cyclist swerving in the road erratically) to the other sources 416, the other sources 416 can determine whether the vehicle or driver have a propensity to drive dangerously. For example, if the other sources 416 determine that the owner of the license plate of the detected vehicle has two strikes of driving under the influence ("DUI"), the other sources 416 can communicate this information to step 404 of the behavior detection process 400 to provide more accurate behavior guessed precomputations. If step 404 of the behavior detection process 400 detects that a vehicle is swerving and that the recorded owner of the vehicle has two DUIs, step 404 can tag the detected vehicle as having a high behavior guess of dangerous driving. In some examples, the autonomous vehicle system 418 can further designate a particular area or vicinity as being "high risk" because of the number of detected dangerous drivers in the particular area. In response, the autonomous vehicle system 418 can reroute autonomous vehicles of the autonomous vehicle fleet to avoid the designated "high risk" areas.

The behavior detection process 400 may then advance to step 406, in which labeling data store can be utilized by the autonomous vehicle system 418. In some implementations, the 3D bounding boxes 424 generated at step 404 can be received at the labeling data store. Thereafter, labels from the labeling data store can be combined with the 3D bounding boxes 424 that were generated at step 404. The labels and 3D bounding boxes 426 may then be provided to a labeling user interface at step 408. The labeling data store can receive 3D bounding boxes 424 from step 404 according to versioned schemas. The versioned schema can contain the 3D bounding box attributes such as dimension, position, orientation, classification, and confidence. The versioned schema can also be updated based on data requirements for future implementation. The precomputation processor of step 404 and the labeling data store (e.g., labeling data storage) can be highly scalable infrastructures (e.g., a messaging service such as publish-subscribe ("pubSub") and a cloud object store) to accommodate both the generation and consumption of load spikes.

Thereafter, the behavior detection process 400 may advance to step 408, in which a labeling user interface may receive data from step 406. In some implementations, the labeling user interface may receive the labels and 3D bounding boxes 426 from the labeling data store at step 406 of the behavior detection process 400. Step 408 of the behavior detection process 400 may further include receiving the initial determination of the guessed behavior from step 404. The labeling user interface may be utilized by a labeler or a user to determine whether the guessed behavior precomputation of step 404 and the 3D bounding boxes and labels of step 406 are correct.

The labeling user interface can include a graphical user interface that can present the guessed behavior precomputation of step 404 and the labels and 3D bounding boxes 426 of step 406 to the labeler. The labeling user interface can further include receiving selections, clicks, or any other interaction from the labeler that is suitable for the intended purpose and understood by a person of ordinary skill in the art. For example, the labeler can provide an input to determine whether the presented behavior object, 3D bounding box, and/or labels are consistent with the detected object. In other implementations, interactions received by the labeling user interface can be provided to step 410 of the behavior detection process 400 along with point cloud data, object behavior labels, and bounding boxes.

The selection in the labeling user interface of step 408 can also be utilized to query for the "best-guess" 3D bounding boxes of the detected object from the guessed behavior precomputation of step 404. A query strategy can be based on a plurality of circumstances such as the guessed behavior, a confidence score from the precomputation output of step 404, and the weighted mix of the guessed behavior and the confidence score (e.g., determining the guessed behavior with the highest confidence). Moreover, the labeling user interaction can provide options to filter out guessed behaviors based on attributes as described herein such as erratic behavior and movements, classification, and dimension of the detected object.

The labeling user interface at step 408 is not only limited to receiving selections from a labeling user, but rather, the labeling user interface can also include hovering. For example, when the labeling user interface enters a specified mode (e.g., via a hotkey), the hovering on or over a target area can trigger previews of guessed behavior precomputation queries. Once the preview of the guessed behavior is satisfactory (e.g., reaching a predetermined threshold or satisfactory to the labeler) the labeler can use another user interaction (e.g., a click) to persist the preview into a real label.

In some implementations, step 408 of the behavior detection process 400 can further include utilizing exposure data (e.g., in combination with ground truth human labelers who can indicate drivers whom they suspect of being "dangerous" by the classifications as described herein. This data may be used to train machine learning classifiers (e.g., at step 412) to further aid in the detection of dangerous drivers. The behavior detection process 400 can further include implementing a GUI for passengers of the autonomous vehicle 102 to flag particular dangerous drivers of which they are suspicious of being unsafe. This process can provide a direct benefit of enhancing passenger safety and comfort knowing that the autonomous vehicle 102 can take their feedback into consideration, but also provide a mechanism to generate ground truth labelled data for further refinement of the behavior detection process 400 (e.g., at step 408). In some examples, the labeling user interface can point out suspicious drivers to the passengers in the autonomous vehicle 102 and request to the driver or passenger whether the report is correct. This further improves the accuracy of the behavior detection process 400 because it provides another point of reference of when determining whether an approaching vehicle is unsafe.

The behavior detection process 400 may then advance to step 410, in which point cloud data and behavior labels can be combined. In some implementations, point cloud data can be received from step 402 and corresponding behavior labels from the labeling data store at step 406. Step 410 of process 400 can further include receiving interactions or selections received by the labeling user interface at step 408.

Thereafter, the behavior detection process 400 may advance to step 412, in which machine learning model training may be utilized by the autonomous vehicle system 418. At step 412 of the behavior detection process 400, model training can include receiving the point cloud data from step 402 of the detected object, the guessed behavior precomputation of step 404, and the labels and 3D bounding boxes 426 of step 406, interactions or selections received by the labeling user interface at step 408, and/or the combination of point cloud data and behavior labels from step 410. By receiving the above-mentioned data from steps 402-410 of the behavior detection process 400, step 412 can include updating or revising stored models (e.g., model training and retraining) to provide better and improved models to step 404, which can then be utilized to better determine the behavior of the object detected by the autonomous vehicle 102. Once an appropriate machine learning model 432 is determined to be satisfactory, the machine learning model 432 can then be provided to the autonomous vehicle 102 or an autonomous vehicle fleet at step 414.

The behavior detection process 400 may then advance to step 414, in which the machine learning model 432 for an autonomous vehicle 102 can be deployed by the autonomous vehicle 102. The machine learning model 432 deployed by the autonomous vehicle 102 may be the machine learning model 432 received from step 412 or from the other sources 416.

In some examples, a passenger in the autonomous vehicle 102 may be able to recognize when the autonomous vehicle 102 begins to drive more defensively. If the passenger is able to recognize the dangerous driver of interest, the passenger may deduce that the autonomous vehicle 102 may be responding to the dangerous driver of interest, specifically. As described herein, the GUI of the autonomous vehicle 102 may identify dangerous drivers for the driver, which can provide direct observability that the autonomous vehicle 102 is attempting to detect such dangerous drivers, and any resultant change in behavior of the dangerous driver can be duly noted as an input by the driver or passenger. When a detected object (e.g., vehicle, cyclist, pedestrian) is tagged as being unsafe, the autonomous vehicle 102 can respond by taking evasive maneuvers to avoid contacting (e.g., colliding into) the unsafe object. For example, the autonomous vehicle 102 may increase its distance from the unsafe vehicle, decrease or increase speed to avoid the unsafe vehicle, or telegraph to other autonomous vehicles in the vicinity the location of the unsafe vehicle and its projected path of travel.

In some implementations, the autonomous vehicle 102 may provide alert information 430 (similar to alert information 428) to the other sources 416 to provide and receive relevant data relating to the detected dangerous vehicle. For example, the alert information 430 can include associated data of the dangerous vehicle (e.g., images and recordings of the vehicle and associated persons) and be provided to the other sources 416 including the autonomous vehicle system 418, law enforcement 420, and city/state/federal authorities 422. By doing so, the other sources 416 can provide additional information of the detected dangerous vehicle relating to the alert information 430 to the autonomous vehicle 102. By providing images or recordings of the detected dangerous vehicle (e.g., an image of a license plate or a driver or a video recording of a cyclist swerving in the road erratically) to the other sources 416, the other sources 416 can determine whether the vehicle or driver have a propensity to drive dangerously. For example, if the other sources 416 determine that the owner of the license plate of the detected vehicle has two strikes of driving under the influence ("DUI"), the other sources 416 can communicate this information to the autonomous vehicle 102 so that the autonomous vehicle 102 can respond to the dangerous vehicle accordingly. For example, if the autonomous vehicle 102 receives information from the other sources 416 that indicate that the recorded owner of the vehicle has two DUIs, the autonomous vehicle 102 can take additional steps, on top of the machine learning model 432 received through the behavior detection process 400, and respond accordingly through evasive driving and/or providing alerts to the autonomous vehicle system 418 and the autonomous vehicle fleet of the location and path of travel of the dangerous vehicle. In some examples, the autonomous vehicle 102 can communicatively connect with the autonomous vehicles of the autonomous vehicles fleet via the autonomous vehicle system 418 or via local connectivity utilizing radio frequency technology.

In other implementations, the autonomous vehicle 102 can provide automatic notifications (e.g., the alert information 430) to local authorities 420 to report potential dangerous drivers (e.g., drunk drivers). The autonomous vehicle 102 can further provide automatic notifications of passengers when the autonomous vehicle 102 is performing defensive driving decisions. In some examples, the autonomous vehicle system 418 can utilize remote assistance or passenger feedback to confirm unsafe behavior of a detected vehicle prior to notifying local authorities 420. The autonomous vehicle 102 can further provide geographic positional data of the dangerous driver to the other sources 416, which may then utilize other tools to capture evidence of the dangerous behavior of the unsafe vehicle. For example, the autonomous vehicle 102 can provide geographic positional data of the dangerous driver to law enforcement 420 and city authorities 422 that have control over traffic cameras along a presumed path of travel of the dangerous driver. In anticipation of the dangerous driver entering a vicinity of a traffic camera, law enforcement 420 and city authorities 422 can record (e.g., take pictures or record video) the driver driving dangerously, which can then be used as evidence that the detected driver is driving in an unsafe manner.

In some implementations, once the behavior detection process 400 identifies a dangerous driver, the autonomous vehicle 102 can respond by performing defensive driving and/or by alerting (e.g., the alert information 430) the local authorities (e.g., law enforcement 420). For example, the autonomous vehicle 102 can employ defensive driving techniques in order to mitigate the increased risk posed by the dangerous road actor. In one example, the autonomous vehicle 102 can increase the space between the autonomous vehicle 102 and the identified dangerous driver (e.g., by increasing or decreasing speed or changing lanes), or change the designated route of the autonomous vehicle 102 to avoid the dangerous road user, altogether. In another example, where the autonomous vehicle 102 identifies that the driver of the dangerous vehicle is distracted and is behind the autonomous vehicle 102, which poses as an increased risk of being rear ended, the autonomous vehicle 102 may decide to brake less aggressively than normal or attempt to increase a rear time gap between the autonomous vehicle 102 and the identified dangerous vehicle in order to mitigate the chance of a rear end collision. An estimation of reaction time for each dangerous driver can be leveraged by the behavior detection process 400 for more accurate predictions, thereby providing a safer/better motion plan.

In other implementations, in addition to a direct behavioral response from the autonomous vehicle 102, such detection can be provided to the local authorities (e.g., law enforcement 420) for assistance or for receiving additional information relating to the detected dangerous driver. Human drivers are often encouraged by the local authorities (e.g., law enforcement 420) to alert the police if they suspect a drunk driver, and the autonomous vehicle system 416 and the autonomous vehicle 102 can provide the same types of alerts to the local authorities (e.g., law enforcement 420). This improves the safety of streets and highways for all road users. In some examples, the alert information 428, 430 can be provided to law enforcement 420 autonomously or with the aid of human confirmation. For example, human confirmation can include utilizing an interface (e.g., a GUI of the autonomous vehicle 102) that allows drivers and passengers to confirm the unsafe driving of detected vehicles, or by utilizing remote assistance to confirm the dangerous behavior prior to alerting the local authorities (e.g., law enforcement 420).

Additionally, to aid passenger comfort and confidence, the autonomous vehicle 102 can notify passengers via an in-car display or application that the autonomous vehicle 102 has identified a potentially dangerous road user and is taking defensive action. The autonomous vehicle 102 may further prepare and ready the safety system 136 of the autonomous vehicle 102 in anticipation of a collision based on the detection of the dangerous vehicle.

In some examples, the autonomous vehicle 102 can provide warnings to surrounding drivers of the detected dangerous driver. For example, the autonomous vehicle 102 can honk its horns, flash headlights and taillights, and alert the autonomous vehicle fleet as described herein.

Figure 5:
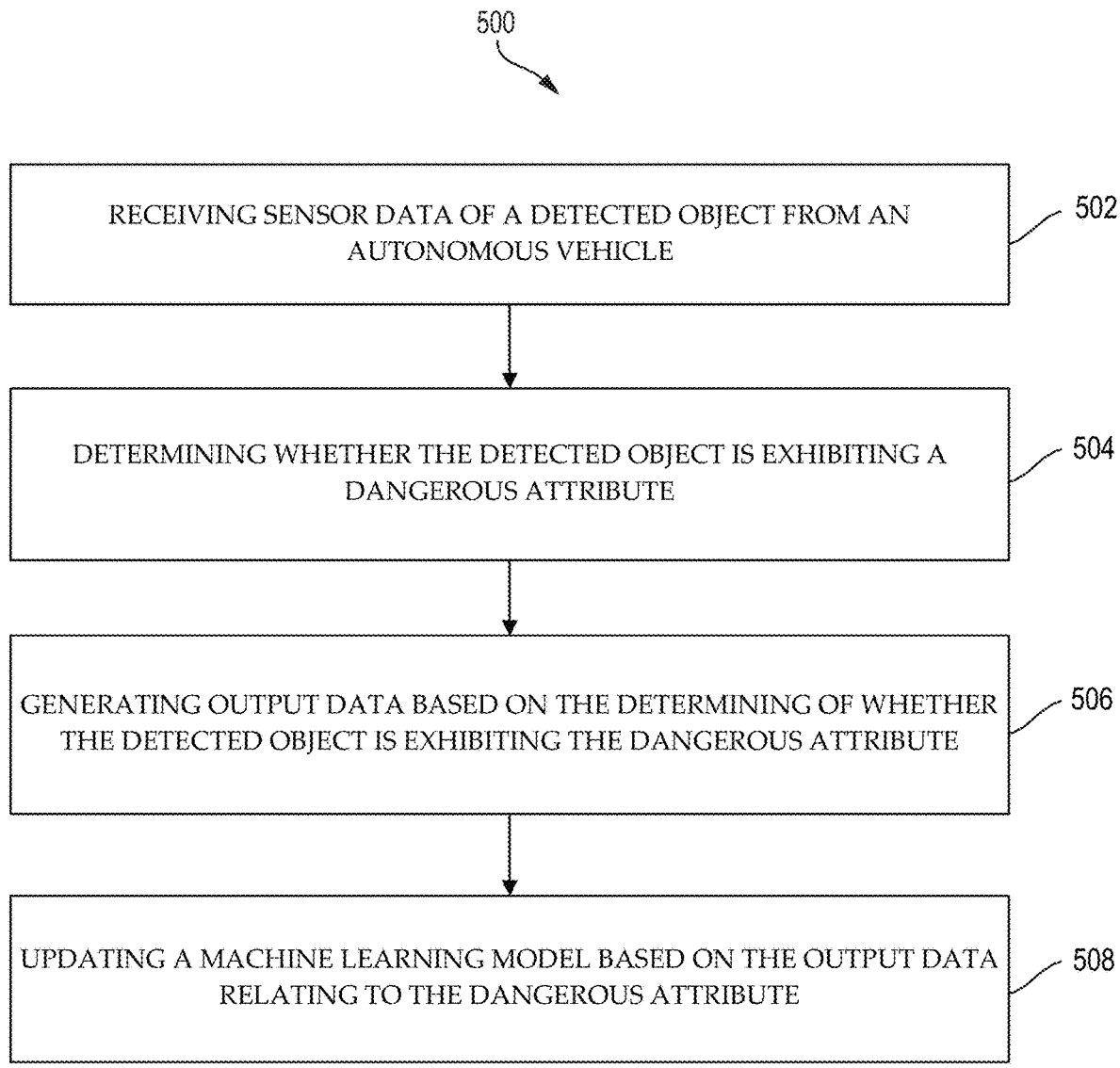
FIG. 5 illustrates an example process of detecting and responding to dangerous road users, according to some aspects of the disclosed technology.

Having disclosed some example system components and concepts, the disclosure now turns to FIG. 5, which illustrates an example method 500 for detecting and responding to dangerous road users. The steps outlined herein are exemplary and can be implemented in any combination thereof, including combinations that exclude, add, or modify certain steps.

At step 502, method 500 can include receiving sensor data of a detected object from an autonomous vehicle. The detected object can include at least one of a motor vehicle, a cyclist, and a pedestrian.

At step 504, method 500 can include determining whether the detected object is exhibiting a dangerous attribute. The dangerous attribute can include at least one of swerving, crossing lane boundaries, and increased reaction time relative to a nominal reaction time.

At step 506, method 500 can include generating output data based on the determining of whether the detected object is exhibiting the dangerous attribute.

At step 508, method 500 can include updating a machine learning model based on the output data relating to the dangerous attribute.

The method 500 can further include receiving a confirmation of the dangerous attribute of the detected object from a graphical user interface of the autonomous vehicle. The method 500 can also include receiving alert information based on the dangerous attribute of the detected object, the alert information including at least one of images, videos, and geographic positional data of the detected object. The method 500 can additionally include receiving information relating to a person associated with the detected object, and updating the output data based on the information relating to the person associated with the detected object. The method 500 can further include providing the updated machine learning model to the autonomous vehicle to assist in automated evasive driving.

Figure 6:
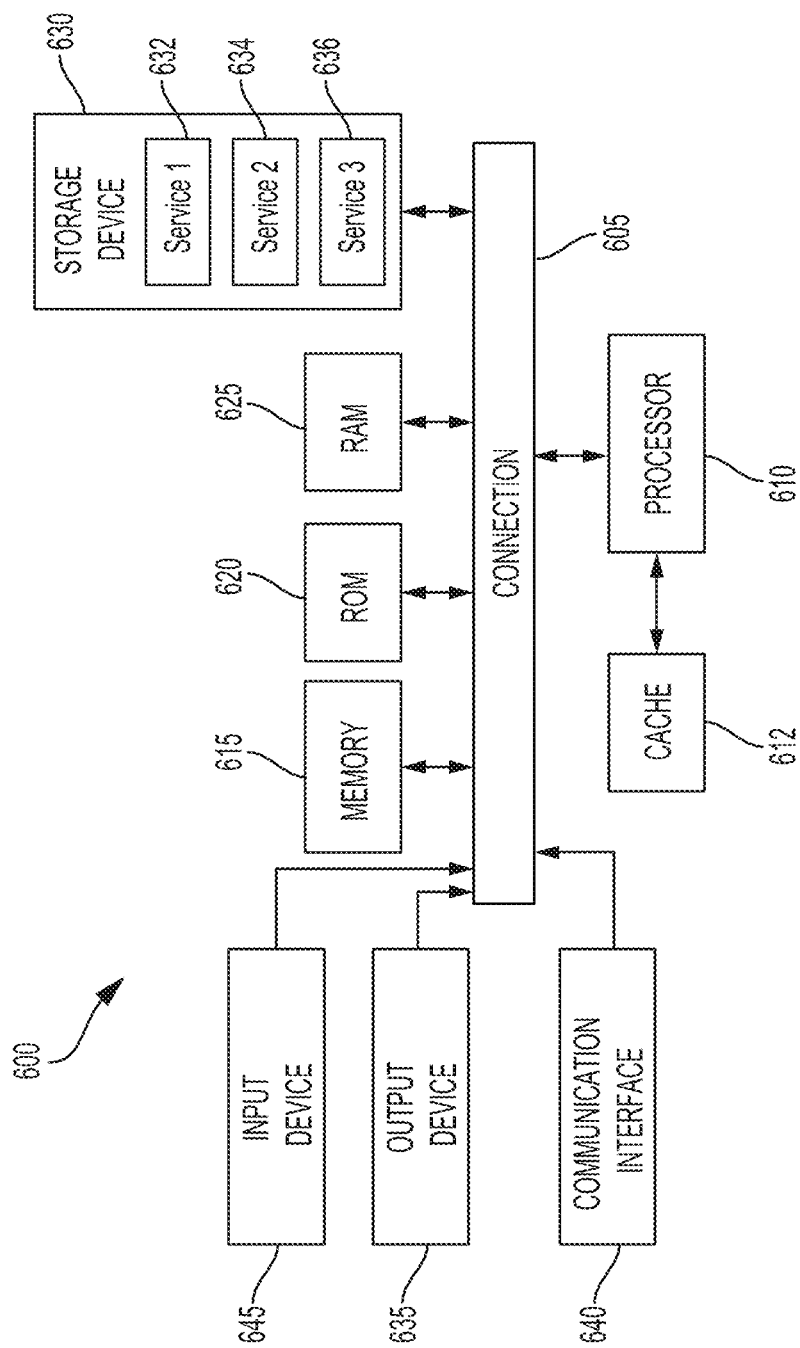
FIG. 6 illustrates an example processor-based system with which some aspects of the subject technology can be implemented.

FIG. 6 illustrates an example processor-based system with which some aspects of the subject technology can be implemented. For example, processor-based system 600 that can be any computing device making up internal computing system 110, remote computing system 150, a passenger device executing the rideshare app 170, internal computing device 130, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; generative adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for detecting and responding to dangerous road users, the computer-implemented method comprising:
   receiving, at an autonomous vehicle system, sensor data of a detected object from an autonomous vehicle;
   generating, by the autonomous vehicle system, a three-dimensional (3D) bounding box around the detected object, wherein the 3D bounding box includes attributes, which comprise a dimension, a position, an orientation, a classification of the detected object, and a confidence of the 3D bounding box;
   determining, by the autonomous vehicle system, whether the detected object is exhibiting a dangerous attribute based on a behavior of the detected object and the attributes of the 3D bounding box;
   generating, by the autonomous vehicle system, output data based on the determining of whether the detected object is exhibiting the dangerous attribute; and
   updating, by the autonomous vehicle system, a machine learning model based on the output data relating to the dangerous attribute.

2. The computer-implemented method of claim 1, wherein the detected object includes at least one of a motor vehicle, a cyclist, and a pedestrian.

3. The computer-implemented method of claim 1, wherein the dangerous attribute includes at least one of swerving, crossing lane boundaries, and increased reaction time relative to a nominal reaction time.

4. The computer-implemented method of claim 1, further comprising receiving a confirmation of the dangerous attribute of the detected object from a graphical user interface of the autonomous vehicle.

5. The computer-implemented method of claim 1, further comprising receiving alert information based on the dangerous attribute of the detected object, the alert information including at least one of images, videos, and geographic positional data of the detected object.

6. The computer-implemented method of claim 1, further comprising:
   receiving information relating to a person associated with the detected object; and
   updating the output data based on the information relating to the person associated with the detected object.

7. The computer-implemented method of claim 1, further comprising providing the updated machine learning model to the autonomous vehicle to assist in automated evasive driving.

8. A system for detecting and responding to dangerous road users, the system comprising:
   one or more processors; and at least one non-transitory computer-readable storage medium having stored therein instructions which, when executed by the one or more processors, cause the system to:

receive sensor data of a detected object from an autonomous vehicle;

generate a three-dimensional (3D) bounding box around the detected object, wherein the 3D bounding box includes attributes, which comprise a dimension, a position, an orientation, a classification of the detected object, and a confidence of the 3D bounding box;

determine whether the detected object is exhibiting a dangerous attribute based on a behavior of the detected object and the attributes of the 3D bounding box;

generate output data based on the determining of whether the detected object is exhibiting the dangerous attribute; and update a machine learning model based on the output data relating to the dangerous attribute.

9. The system of claim 8, wherein the detected object includes at least one of a motor vehicle, a cyclist, and a pedestrian.

10. The system of claim 8, wherein the dangerous attribute includes at least one of swerving, crossing lane boundaries, and increased reaction time relative to a nominal reaction time.

11. The system of claim 8, wherein the instructions which, when executed by the one or more processors, cause the system to receive a confirmation of the dangerous attribute of the detected object from a graphical user interface of the autonomous vehicle.

12. The system of claim 8, wherein the instructions which, when executed by the one or more processors, cause the system to receive alert information based on the dangerous attribute of the detected object, the alert information including at least one of images, videos, and geographic positional data of the detected object.

13. The system of claim 8, wherein the instructions which, when executed by the one or more processors, cause the system to:

receive information relating to a person associated with the detected object; and update the output data based on the information relating to the person associated with the detected object.

14. The system of claim 8, wherein the instructions which, when executed by the one or more processors, cause the system to provide the updated machine learning model to the autonomous vehicle to assist in automated evasive driving.

15. A non-transitory computer-readable storage medium comprising:

instructions stored on the non-transitory computer-readable storage medium, the instructions, when executed by one more processors, cause the one or more processors to:

receive sensor data of a detected object from an autonomous vehicle;

generate a three-dimensional (3D) bounding box around the detected object, wherein the 3D bounding box includes attributes, which comprise a dimension, a position, an orientation, a classification of the detected object, and a confidence of the 3D bounding box;

determine whether the detected object is exhibiting a dangerous attribute based on a behavior of the detected object and the attributes of the 3D bounding box;

generate output data based on the determining of whether the detected object is exhibiting the dangerous attribute; and update a machine learning model based on the output data relating to the dangerous attribute.

16. The non-transitory computer-readable storage medium of claim 15, wherein the dangerous attribute includes at least one of swerving, crossing lane boundaries, and increased reaction time relative to a nominal reaction time.

17. The non-transitory computer-readable storage medium of claim 15, wherein the instructions, when executed by the one more processors, cause the one or more processors to receive a confirmation of the dangerous attribute of the detected object from a graphical user interface of the autonomous vehicle.

18. The non-transitory computer-readable storage medium of claim 15, wherein the instructions, when executed by the one more processors, cause the one or more processors to receive alert information based on the dangerous attribute of the detected object, the alert information including at least one of images, videos, and geographic positional data of the detected object.

19. The non-transitory computer-readable storage medium of claim 15, wherein the instructions, when executed by the one more processors, cause the one or more processors to:

receive information relating to a person associated with the detected object; and update the output data based on the information relating to the person associated with the detected object.

20. The non-transitory computer-readable storage medium of claim 15, wherein the instructions, when executed by the one more processors, cause the one or more processors to provide the updated machine learning model to the autonomous vehicle to assist in automated evasive driving.

* * * * *